(12) United States Patent
Han

(10) Patent No.: US 8,125,468 B2
(45) Date of Patent: Feb. 28, 2012

(54) LIQUID MULTI-TOUCH SENSOR AND DISPLAY DEVICE

(75) Inventor: Jefferson Y. Han, Holliswood, NY (US)

(73) Assignee: Perceptive Pixel Inc., New York, NY (US)

( * ) Notice: Subject to any disclaimer, the term of this patent is extended or adjusted under 35 U.S.C. 154(b) by 769 days.

(21) Appl. No.: 12/182,440

(22) Filed: Jul. 30, 2008

(65) Prior Publication Data

US 2009/0033637 A1 Feb. 5, 2009

Related U.S. Application Data

(60) Provisional application No. 60/952,709, filed on Jul. 30, 2007, provisional application No. 60/953,966, filed on Aug. 3, 2007.

(51) Int. Cl.
*G06F 3/042* (2006.01)
*G06K 11/06* (2006.01)

(52) U.S. Cl. ..................................... 345/175; 178/18.11

(58) Field of Classification Search .......... 345/173–178; 178/18.01–18.11
See application file for complete search history.

(56) References Cited

U.S. PATENT DOCUMENTS 3,200,701 A 8/1965 White
(Continued)

FOREIGN PATENT DOCUMENTS

JP 200494569 3/2004
(Continued)

OTHER PUBLICATIONS

Boual, Sophie; Large, Timothy; Buckingham, Mark; Travis, Adrian; Munford, Simon, "Wedge Displays as Cameras," 2006 Society for Information Display (SID) International Symposium Digest of technical Papers, pp. 1999-2002 (2006).

(Continued)

*Primary Examiner* — Bipin Shalwala
*Assistant Examiner* — Steven Holton
(74) *Attorney, Agent, or Firm* — Fish & Richardson P.C.

(57) ABSTRACT

High-resolution multi-touch sensor and display device where the interaction medium is liquid, enabling more realistic tactile experience for simulations of synthetic wet environments. Based on frustrated total internal reflection, the device employs liquid within a tank as the optical waveguide that receives light, such as infrared light, that undergoes total internal reflection and an imaging camera that detects light that escapes from the tank caused by frustration of the total internal reflection due to contact of the water by a user.

28 Claims, 3 Drawing Sheets

U.S. PATENT DOCUMENTS

| | | | |
|---|---|---|---|
| 3,673,327 | A | 6/1972 | Johnson et al. |
| 3,846,826 | A | 11/1974 | Mueller |
| 4,134,063 | A | 1/1979 | Nicol et al. |
| 4,346,376 | A | 8/1982 | Mallos |
| 4,484,179 | A | 11/1984 | Kasday |
| 4,561,017 | A * | 12/1985 | Greene .......................... 348/707 |
| 4,668,861 | A | 5/1987 | White |
| 5,942,761 | A | 8/1999 | Tuli |
| 6,323,846 | B1 | 11/2001 | Westerman et al. |
| 6,883,919 | B2 | 4/2005 | Travis |
| 6,895,164 | B2 | 5/2005 | Saccomanno |
| 6,972,753 | B1 | 12/2005 | Kimura et al. |
| 6,997,558 | B2 | 2/2006 | Perlin et al. |
| 7,302,152 | B2 | 11/2007 | Luther et al. |
| 7,330,629 | B2 | 2/2008 | Cooke et al. |
| 7,351,949 | B2 | 4/2008 | Oon et al. |
| 7,394,058 | B2 | 7/2008 | Chua et al. |
| 7,410,286 | B2 | 8/2008 | Travis |
| 7,412,119 | B2 | 8/2008 | Smits |
| 7,465,914 | B2 * | 12/2008 | Eliasson et al. ................ 250/221 |
| 7,705,835 | B2 * | 4/2010 | Eikman .......................... 345/176 |
| 7,714,849 | B2 * | 5/2010 | Pryor ............................. 345/173 |
| 2003/0210537 | A1 | 11/2003 | Engelmann |
| 2004/0071417 | A1 | 4/2004 | Veligdan |
| 2005/0068537 | A1 | 3/2005 | Han et al. |
| 2005/0200293 | A1 | 9/2005 | Naugler et al. |
| 2006/0022956 | A1 | 2/2006 | Lengeling et al. |
| 2006/0026521 | A1 | 2/2006 | Hotelling et al. |
| 2006/0026535 | A1 | 2/2006 | Hotelling et al. |
| 2006/0026536 | A1 | 2/2006 | Hotelling et al. |
| 2006/0033724 | A1 | 2/2006 | Chaudhri et al. |
| 2006/0053387 | A1 | 3/2006 | Ording |
| 2006/0085757 | A1 | 4/2006 | Andre et al. |
| 2006/0086896 | A1 | 4/2006 | Han |
| 2006/0188196 | A1 | 8/2006 | Charters et al. |
| 2006/0227120 | A1 | 10/2006 | Eikman |
| 2007/0070050 | A1 | 3/2007 | Westerman et al. |
| 2007/0084989 | A1 | 4/2007 | Lange et al. |
| 2007/0152985 | A1 | 7/2007 | Ostergaard et al. |
| 2008/0029691 | A1 | 2/2008 | Han |
| 2008/0150913 | A1 | 6/2008 | Bell et al. |
| 2008/0179507 | A2 | 7/2008 | Han |
| 2008/0284925 | A1 | 11/2008 | Han |
| 2010/0302185 | A1 | 12/2010 | Han |
| 2010/0302196 | A1 | 12/2010 | Han |
| 2010/0302210 | A1 | 12/2010 | Han |

FOREIGN PATENT DOCUMENTS

| | | |
|---|---|---|
| JP | 2006318512 | 11/2006 |
| WO | 0172037 | 9/2001 |
| WO | 2005029172 | 3/2005 |
| WO | 2008017077 | 2/2008 |
| WO | 2009018317 | 2/2009 |
| WO | 2009020940 | 2/2009 |
| WO | 2010141372 | 12/2010 |
| WO | 2010141380 | 12/2010 |
| WO | 2010141453 | 12/2010 |

OTHER PUBLICATIONS

Non-final Office Action issued in U.S. Appl. No. 11/833,908, mailed Sep. 13, 2010, 49 pages.

Non-final Office Action issued in U.S. Appl. No. 12/185,782, mailed Jan. 12, 2011, 14 pages.

International Search Report dated Oct. 20, 2008 from WO08/017077, 3 pages.

International Search Report dated Feb. 19, 2009 from WO09/020940, 2 pages.

International Search Report dated Jan. 29, 2009 from WO09/018317, 2 pages.

Buxton, W., Hill, R., and Rowley P., "Issues and Techniques in Touch-Sensitive Tablet Input," Proceedings of the 12th Annual Conference on Computer Graphics and Interactive Techniques SIGGRAPH '85. ACM Press, New York, NY, 215-224 (1985).

Han, Jefferson Y., "Low-Cost Multi-Touch Sensing Through Frustrated Total Internal Reflection," Media Research Laboratory, (New York University; Oct. 23-27, 2005; Seattle, Washington), 115-118.

Lee, S., Buxton, W. and Smith, K.C., "A Multi-Touch Three Dimensional Touch-Sensitive Tablet," Proceedings of the SIGCHI Conference on Human Factors in Computing Systems (San Francisco, CA, USA), CHI '85. ACM Press, New York, NY 21-25 (1955).

Malik, S and Laszio, J., "Visual Touchpad: A Two-Handed Gestural Input Device," Proceedings of the 6th International Conference on Multimodal Interfaces (State College, PA USA, Oct. 13-15, 2004), ICMI '04. ACM Press, New York, NY 289-296 (2004), 8 pgs.

Matsushita, N. and Rekimoto, J., "HoloWall: Designing a Finger, Hand, Body and Object Sensitive Wall," Proceedings of the 10th Annual ACM Symposium on User Interface Software and Technology (Banff, Alberta, Canada, Oct. 14-17, 1997), UIST '97. ACM Press, New York, NY 209-210 (1997).

Rekimoto, J., "SmartSkin: An Infrastructure for Freehand Manipulation on Interactive Surfaces," Proceedings of the SIGCHI Conference on Human Factors in Computing Systems, CHI '02. ACM Press, New York, NY 113-120 (2002), 8 pgs.

Westerman, W., Elias, J.G., and Hedge, A., "Multi-Touch: A New Tactile 2-D Gesture Interface for Human-Computer Interaction," Proceedings of the Human Factors and Ergonomics Society 45th Annual Meeting (Minneapolis/St. Paul, MN, Oct. 2001), 632-636 (2001).

Wilson, A.D., "TouchLight: An Imaging Touch Screen and Display for Gesture-Based Interaction," Proceedings of the 6th International Conference on Multimodal Interfaces (State College, PA USA, Oct. 13-15, 2004), ICMI '04. ACM Press, New York, NY (2004), 6 pgs.

* cited by examiner

LIQUID MULTI-TOUCH SENSOR AND DISPLAY DEVICE

REFERENCE TO RELATED APPLICATION

This application claims priority to U.S. Provisional Patent Application No. 60/952,709, filed Jul. 30, 2007, and also claims priority to U.S. Provisional Patent Application No. 60/953,966, filed Aug. 3, 2007. The disclosures of U.S. Provisional Patent Application Nos. 60/952,709 and 60/953,966 are incorporated herein by reference.

BACKGROUND OF THE INVENTION

1. Field of the Invention

The present invention relates to a liquid multi-touch sensor and display device and, more particularly, to a high precision multi-touch screen where the interaction medium is liquid, enabling more realistic tactile experience for simulations of synthetic wet environments.

2. Description of the Related Art

Touch-screens are graphical display devices that have the ability to sense where and when a finger from a user is in contact with it. Typically, touch-screens are based on a solid or rigid surface of interaction, such as glass or plastic, usually directly utilizing the display surface of the core CRT or LCD display.

There have been some previous work in enabling touch sensing on more extended surfaces, such as arbitrary walls, tabletops, and some non-planar objects, by, for instance, vibration sensing techniques, and graphical display is served by projecting graphics onto the surface externally using a projector.

Clouds of water-vapor (e.g. fog) have also been utilized as a surface on which to project imagery, including recent innovations such as disclosed in U.S. Pat. No. 6,819,487 ("Fogscreen"), incorporated herein by reference, which describes generating a thin plane of fog in free-space for extended areas. Such a projection screen has interesting properties that are useful for certain applications and since the screen is not rigid or solid, the user may pass his/her hand through the image or walk right through it.

The publication Greene, R., "The Drawing Prism: A Versatile Graphic Input Device," Proceedings of the 12th Annual Conference on Computer Graphics and Interactive Techniques SIGGRAPH '85, ACM Press, New York, N.Y., 103-110 (1985) ("Greene 1985"), incorporated herein by reference, exploits FTIR on the hypotenuse face of a large right angle prism to sense amorphous contacts on a rigid surface. As described, it utilizes a thin layer of oil or water on the interaction surface to maintain adequate performance due to the variable nature of FTIR response. This layer is not substantial, and is only used to wet the surface of the rigid prism. Furthermore, the prism necessary in even modestly scaled applications is impractically large, heavy, and bulky.

SUMMARY OF THE INVENTION

In accordance with the present invention, a liquid multi-touch sensor and display device (system) comprises a tank containing a liquid therein and adapted to receive light and to cause at least some of the received light to undergo total internal reflection through the liquid within the tank, the liquid and the tank collectively adapted to allow the total internal reflection to be frustrated upon occurrence of a physical phenomena, and adapted to allow some of the light undergoing total internal reflection to escape from the tank when the total internal reflection is frustrated, and an image sensor adapted to detect light escaping the tank.

As an aspect of the invention, an IR emitter is disposed adjacent the tank for emitting the light received by the tank.

As a further aspect of the invention, the system includes an isolating surface on which the tank containing the liquid is disposed, an IR emitter disposed beneath the isolating surface for emitting IR light, and an optical device for redirecting the emitted IR light into the tank, the light received by the tank being the redirected IR light.

As a feature of this aspect, the optical device is a right-angle prism disposed adjacent to a side of the tank.

As another feature of this aspect, the optical device is a mirror disposed adjacent to a side of the tank.

As another aspect of the invention, the physical phenomena comprises contacting the liquid within the tank with an object so that the total internal reflection is frustrated upon contacting the liquid.

As a feature of this aspect, the object is a finger of a person.

As an additional aspect of the invention, the physical phenomena comprises contacting the liquid within the tank at multiple locations by multiple objects so that the total internal reflection is frustrated at said multiple locations.

As a feature, the multiple objects are first and second fingers of a person.

As a further aspect of the invention, the image sensor is adapted to discriminately detect light escaping from a bottom surface of the tank.

As another aspect of the invention, the system includes a light source adapted to emit light of predetermined wavelengths, wherein the tank is adapted to receive the light emitted by the light source, and the image sensor is adapted to detect light only substantially at the predetermined wavelengths.

As an additional aspect of the invention, the system includes a diffuser disposed beneath the tank and a projector for projecting a two-dimensional video image onto the diffuser, the tank and the liquid therein being adapted to allow the video image projected onto the diffuser to be seen through the tank.

As yet a further aspect of the invention, multiple image sensors are provided to detect light escaping from respectively different portions of the tank.

As yet another aspect of the invention, the system includes an LCD display panel disposed between the image sensor and a bottom of the tank for displaying a video image, the video image being viewable through the tank, and the LCD display panel being transparent to light escaping the tank so as to not prevent the escaping light from being detected by the image sensor.

In accordance with a method of multi-touch sensing, the method comprises the steps of receiving light within a tank containing a liquid therein, internally reflecting the received light through the liquid within the tank, frustrating the internally reflected light within the tank to cause some of the reflected light to escape the tank, and imaging the escaped light.

As an aspect of this method embodiment, the method further comprises emitting the light received by the tank by an IR emitter, the IR emitter disposed adjacent the tank.

As a further aspect, the method further includes disposing the tank on an isolating surface, emitting IR light by an IR emitter disposed beneath the isolating surface, and redirecting the emitted IR light into the tank, the received light within the tank being the redirected IR light.

As a feature of this aspect, redirecting the emitted IR light is carried out by a right-angle prism disposed adjacent to a side of the tank.

As another feature of this aspect, redirecting the emitted IR light is carried out by a mirror disposed adjacent to a side of the tank.

As another aspect, frustrating the internally reflected light is carried out by contacting the liquid within the tank with an object.

As an additional aspect, frustrating the internally reflected light comprises contacting the liquid within the tank with a finger of a person.

As yet a further aspect, frustrating the internally reflected light comprises frustrating the internally reflected light simultaneously at a plurality of positions by contacting with multiple objects the liquid within the tank.

As a feature of this aspect, the multiple objects are first and second fingers of a person.

As a further aspect, imaging the escaped light comprises imaging discriminately light escaping from a bottom surface of the tank.

As another aspect, receiving light within the tank comprises receiving light of a predetermined wavelength, and imaging the escaped light comprises imaging light only substantially at the predetermined wavelength.

As an additional aspect, the method further comprises projecting a two-dimensional video image onto a diffuser disposed beneath the tank, the projected video image being viewable through the tank.

As yet a further aspect, imaging the escaped light comprises imaging by a plurality of image sensors light escaping from respectively different portions of the tank.

As yet another aspect, the method further comprises disposing an LCD display panel beneath the tank, and displaying a video image by the LCD display panel, the display video image being viewable through the tank, and the LCD display panel being transparent to the escaped light.

Various other objects, advantages and features of the present invention will become readily apparent to those of ordinary skill in the art, and the novel features will be particularly pointed out in the appended claims.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which.

DETAILED DESCRIPTION OF THE PRESENT INVENTION

In accordance with the present invention, a liquid, such as water, is provided as the optical waveguide itself, thus making the entire interaction medium fluid. This, combined with appropriately synthesized imagery driven by the sensor data, effectively conveys an experience such as a virtual pond simulation, and which is enhanced by the fact that the user feels a true wet tactile sensation upon contact.

The system triggers on true wet contact by the user with the liquid, and not on very slight hovers, which is important for an immersive user experience. The system also robustly detects any significant mechanical disturbance in the surface of the liquid. Ripples, waves and splashes are all detected accurately by the sensor, such as when water or a solid object is dropped into the water or when a user splashes liquid from one side of the system to the other. The shapes and contours of these effects are captured very accurately. Unlike Greene 1985, the present invention accommodates a significant depth of liquid, rather than merely being a wetting of a solid screen, allowing the user to effectively "reach" into the surface. Also unlike Greene 1985, the present invention doesn't require a large additional optical element to function, instead using the water itself as the primary optically active element and nothing else.

Figure 1:
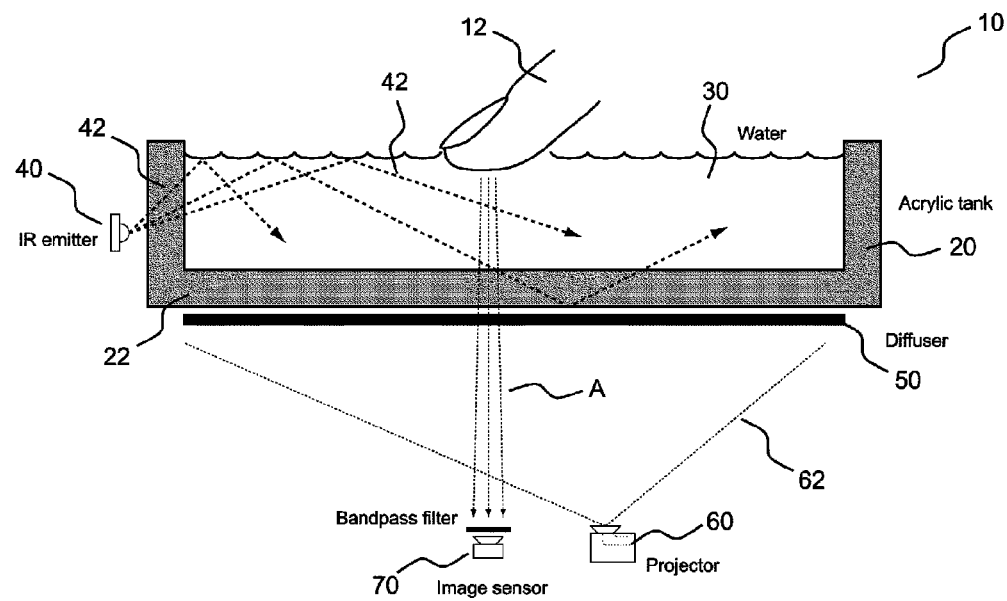
FIG. 1 is a schematic illustration of the liquid multi-touch sensor and display device in accordance with the present invention.

FIG. 1 of the drawings is a schematic illustration of a liquid multi-touch sensor and display device 10 (or, simply, "system 10") in accordance with the present invention. As shown, system 10 includes a relatively shallow (e.g., 1 to 2 inches deep) acrylic tank 20 filled with water 30 or other suitable liquid (collectively referred to herein, for convenience, as "water 30"). In accordance with the present invention, infrared light 42, produced by an IR emitter 40 or other suitable device, is introduced laterally into tank 20 in a manner that traps much of the light 42 within water 30 due to total internal reflection (TIR).

System 10 further includes a diffuser 50 disposed immediately adjacent to a bottom surface 22 of tank 20. A video projector 60 projects a 2-dimensional image 62 (still or moving image) onto diffuser 50. An image sensor 70, preferably disposed alongside projector 60, also is directed at diffuser 50. Image sensor 70 at each frame effectively captures all areas that are in contact at that moment. Well-known machine vision operations are used to analyze the image sequence from the sensor into strokes and events, and are used by a computing system to synthesize appropriate graphics.

In accordance with the present invention, when an object such as a finger 12 from a user touches water 30, some of the infrared light 42 is scattered (frustrated) locally and the frustrated light (represented by arrows "A" in FIG. 1) reaches image sensor 70 through diffuser 50. The frustration of TIR is commonly known as frustrated total internal reflection (FTIR), and a discussion of applying FTIR within a multi-input display system is described in greater detail in U.S. Patent Publication No. 2008/0029691A1, which was published on Feb. 7, 2008, and assigned to the assignee of the present invention. U.S. Patent Publication No. 2008/0029691A1 (hereinafter, the '691 publication) is incorporated herein by reference. As described, multi-input display systems (also sometimes referred to as multi-touch sensing screens) allow the detection of very many simultaneous contact points on a display device, and utilize the phenomenon of FTIR to provide highly precise and accurate determination of multiple points of contact on the screen. In the '691 publication, infrared light is introduced into platen glass or acrylic waveguide, and when a finger or other object contacts the waveguide, light scatters and is received by an imaging sensor, which determines the position and time of each contact. In accordance with the present invention, and as described herein, the liquid multi-touch sensor and display device employs a liquid as the optical waveguide.

The liquid multi-touch sensor and display device of the present invention includes a number of variations from that shown in FIG. 1 and as described above. In particular, certain variations shown and described in the '691 publication may be applied to the present invention. In one variation, the system includes multiple image sensors and/or multiple projectors, as similarly shown in FIG. 8 of the '691 publication. Such systems are particularly well suited for very large tanks. In another variation, rather than employing a projector and a diffuser, the system may include an LCD display panel disposed between the bottom of the tank and the image sensor, and that is designed to be transparent to infrared light to allow light that escapes the tank to be imaged by the image sensor (e.g., FIG. 9 of the '691 publication shows similar use of an LCD panel). In a further variation, multiple wavelengths of light may be employed (e.g., FIG. 10 of the '691 publications similarly shows employing two wavelengths of light). Multiple imaging sensors also may be employed in this variation for the reasons discussed in the '691 publication. Other features and variations described in the '691 publication, as applicable may be employed.

The system may further employ those variations described in U.S. patent application No. 60/953,966, as applicable. U.S. patent application No. 60/953,966 (hereinafter, the '966 application) is assigned to the assignee of the present application and is incorporated herein by reference. In yet another variation of the present invention, the system employs one or more different types of image sensors, like those discussed in the '966 application with reference to FIGS. 2A and 2B therein. Specifically, the image sensor may be a flat image sensor or a wedge camera. The system may further employ, in lieu of a projector, an LCD panel, along with a backlight diffuser and backlights, such as similarly described in the '966 application with reference to FIGS. 7A and 7B therein. In another variation, the system may employ, in lieu of projector 60 and image sensor 70, an LCD panel having an integrated photo-sensor, along with and LCD backlight unit, such as similarly described in the '966 application with reference to FIG. 8 therein. Other variations described in the '966 application, as applicable, may be employed. As another variation, the system, and all variations thereof (as applicable), does not employ a projector and, thus, is liquid multi-touch sensor system.

Figure 2:
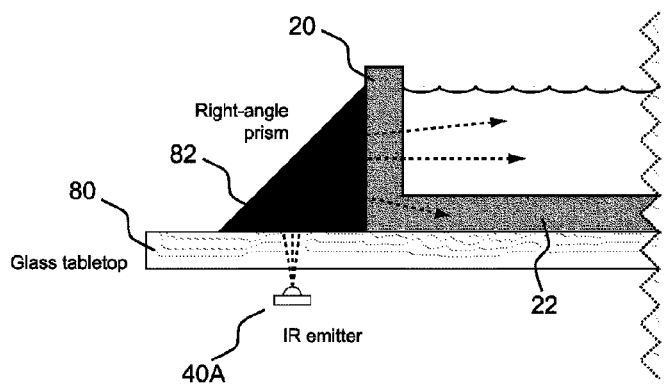
FIG. 2 is a schematic illustration of a passive optical folding system that may be employed within the present invention.

FIG. 2 schematically illustrates, in accordance with the present invention, a passive optical folding system that, when employed within the liquid multi-touch sensor and display device of the present invention, advantageously completely electrically isolates the infrared light source from the liquid. As shown in FIG. 2, tank 20 is placed on an electrically insulating surface 80 through which infrared light passes and, as shown in the figure, may be a glass tabletop surface. IR emitter 40A is disposed beneath insulating surface 80 and emits IR light upwards towards a right-angle prism 82 that redirects the IR light into tank 20. Other suitable devices that properly redirect the IR light (e.g. mirrors, light-pipes, etc.) may be used in place of right-angle prism 82.

With reference again to FIG. 1, projector 60 and image sensor 70 also are disposed beneath insulating surface 80, and the frustrated light passing through the bottom surface 22 of tank 20 also passes through insulating surface 80, as well as diffuser 50, before being sensed by image sensor 70. Hence both projector 60 and image sensor 70, along with IR emitter 40A, are electrically insulated from the water within tank 20.

As discussed above, users of the liquid multi-touch sensor and display device of the present invention are interacting with the liquid within the tank. Such interaction in combination with the existence of an infrared light source that most likely is electrically generated creates a potential shock hazard (i.e., due to water spillage as well as a build-up of condensation). In accordance with the present invention, system 10 shown in FIG. 1 that employs the passive optical folding system in FIG. 2 advantageously completely isolates the electrical source (i.e., the IR emitter), as well as the image sensor and the projector, from the water. Moreover, such a system beneficially requires only a few components above insulating surface 80, namely tank 20, the water therein, and right-angle prism 82. The remaining components may be, as desired, safely disposed beneath insulating surface 80. Certain other variations of the present invention as identified above may similarly employ the passive optical folding system in FIG. 2.

Figure 3:
FIG. 3 shows an exemplary system embodying the present invention in operation.
Figure 4:
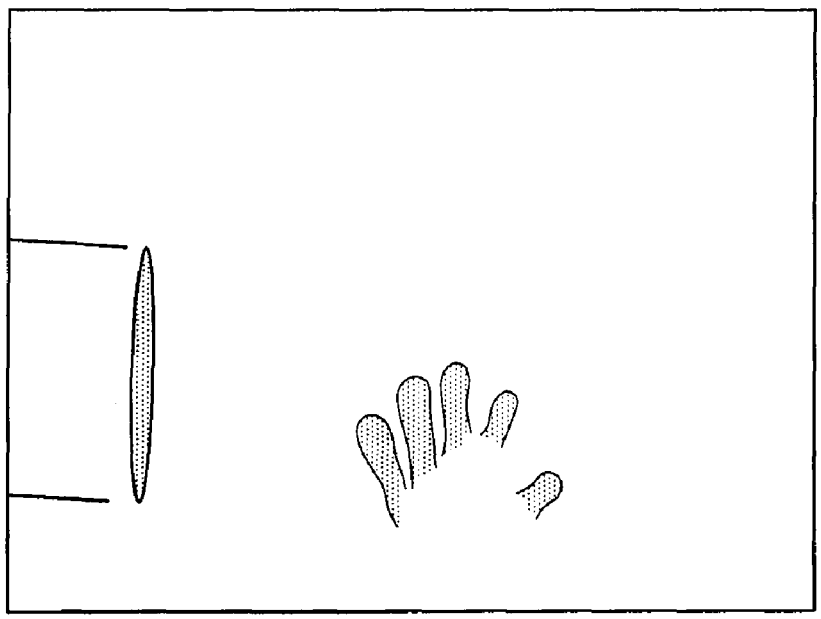
FIG. 4 is raw sensor data of multiple fingers interacting with the inventive system.
Figure 5:
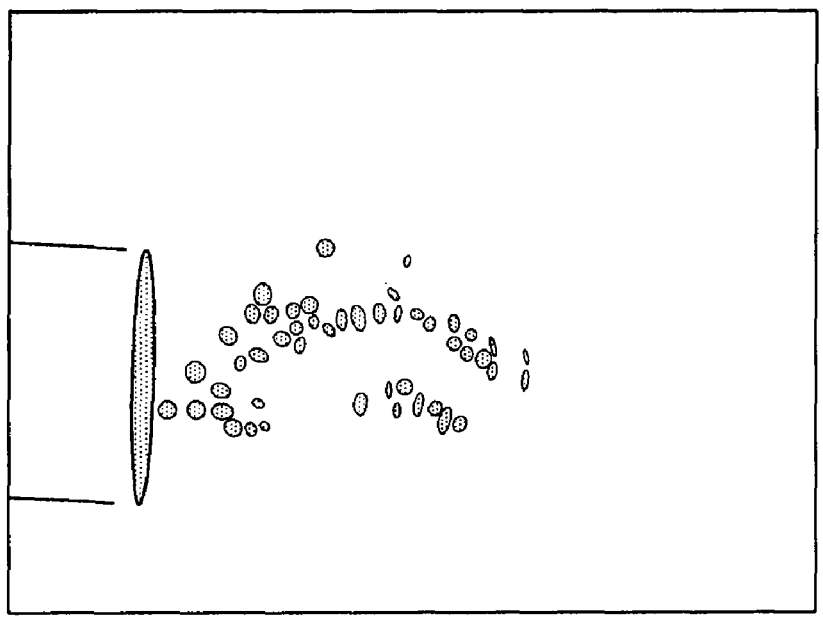
FIG. 5 is raw sensor data of water splashes clearly being detected by the inventive system.

FIG. 3 shows an exemplary system embodying the present invention in operation. FIG. 4 is raw sensor data of multiple fingers interacting with the inventive system. FIG. 5 is raw sensor data of water splashes clearly being detected by the inventive system.

The present invention has been described in the context of a number of embodiments, and multiple variations and examples thereof. It is to be understood, however, that other expedients known to those skilled in the art or disclosed herein may be employed without departing from the spirit of the invention.

Therefore, it is intended that the appended claims be interpreted as including the embodiments described herein, the alternatives mentioned above, and all equivalents thereto.

What is claimed is:

1. A liquid multi-touch sensor system, comprising:
   a tank comprising side walls and a bottom wall, the tank being configured to contain a liquid therein and having an open front that exposes the liquid contained in the tank to a user of the liquid multi-touch sensor system;
   an optical system configured to introduce light through a side wall of the tank laterally into the liquid contained in the tank, wherein the tank is configured to cause introduced light to undergo total internal reflection through the liquid contained in the tank, allow the total internal reflection to be frustrated upon an object contacting the liquid contained in the tank through the open front of the tank, and allow at least some of the light undergoing total internal reflection to escape from the tank when the total internal reflection is frustrated; and
   an image sensor adapted to detect light escaping the tank.

2. The system of claim 1, wherein the optical system comprises an infrared (IR) emitter disposed adjacent the tank for emitting the light received by the tank.

3. The system of claim 1, further comprising an isolating surface on which the tank containing the liquid is disposed, wherein the optical system comprises an IR emitter disposed beneath the isolating surface for emitting IR light; and an optical device for redirecting the emitted IR light into the tank, the light received by the tank being the redirected IR light.

4. The system of claim 3, wherein the optical device is a right-angle prism disposed adjacent to a side of the tank.

5. The system of claim 3, wherein the optical device is a mirror disposed adjacent to a side of the tank.

6. The system of claim 1, wherein the object is a finger of a person.

7. The system of claim 1, wherein the tank is configured to allow the total internal reflection to be frustrated upon multiple objects contacting the liquid within the tank at multiple locations so that the total internal reflection is frustrated at said multiple locations.

8. The system of claim 7, wherein the multiple objects are first and second fingers of a person.

9. The system of claim 1, wherein the image sensor is adapted to discriminately detect light escaping from a bottom surface of the tank.

10. The system of claim 1, wherein the optical system comprises a light source adapted to emit light of predetermined wavelengths; wherein the tank is adapted to receive the light emitted by the light source, and the image sensor is adapted to detect light only substantially at the predetermined wavelengths.

11. The system of claim 1, further comprising a diffuser disposed beneath the tank and a projector for projecting a two-dimensional video image onto the diffuser, the tank and the liquid therein being adapted to allow the video image projected onto the diffuser to be seen through the tank.

12. The system of claim 1, wherein the image sensor comprises a plurality of image sensors adapted to detect light escaping from respectively different portions of the tank.

13. The system of claim 1, further comprising a liquid crystal display (LCD) panel disposed between the image sensor and a bottom of the tank for displaying a video image, the video image being viewable through the tank, and the LCD panel being transparent to light escaping the tank so as to not prevent the escaping light from being detected by the image sensor.

14. The system of claim 1, wherein the image sensor is adapted to detect splashes in the liquid contained in the tank based on light escaping the tank when the user splashes the liquid contained in the tank.

15. The system of claim 1, wherein the tank is configured to allow a user to reach through the liquid contained in the tank to the bottom wall of the tank.

16. A method of multi-touch sensing, comprising the steps of:
introducing, by an optical system, light through a side wall of a tank laterally into liquid contained in the tank, the tank comprising side walls and a bottom wall and having an open front that exposes the liquid contained in the tank to a user;
internally reflecting light through the liquid within the tank, the tank being configured to cause introduced light to undergo total internal reflection through the liquid contained in the tank;
frustrating, upon an object contacting the liquid contained in the tank through the open front of the tank, the internally reflected light within the tank to cause some of the reflected light to escape the tank, the tank being configured to allow the total internal reflection to be frustrated upon the object contacting the liquid contained in the tank through the open front of the tank and allow at least some of the light undergoing total internal reflection to escape from the tank when the total internal reflection is frustrated; and
imaging the escaped light.

17. The method of claim 16, comprising emitting the light received by the tank by an IR emitter, the IR emitter disposed adjacent the tank.

18. The method of claim 16, comprising disposing the tank on an isolating surface; emitting IR light by an IR emitter disposed beneath the isolating surface; and
redirecting the emitted IR light into the tank, the received light within the tank being the redirected IR light.

19. The method of claim 18, wherein redirecting the emitted IR light is carried out by a right-angle prism disposed adjacent to a side of the tank.

20. The method of claim 18, wherein redirecting the emitted IR light is carried out by a mirror disposed adjacent to a side of the tank.

21. The method of claim 16, wherein frustrating the internally reflected light comprises contacting the liquid within the tank with a finger of a person.

22. The method of claim 16, wherein frustrating the internally reflected light comprises frustrating the internally reflected light simultaneously at a plurality of positions by contacting with multiple objects the liquid within the tank.

23. The method of claim 22, wherein the multiple objects are first and second fingers of a person.

24. The method of claim 16, wherein imaging the escaped light comprises imaging discriminately light escaping from a bottom surface of the tank.

25. The method of claim 16, wherein introducing light comprises introducing light of a predetermined wavelength, and imaging the escaped light comprises imaging light only substantially at the predetermined wavelength.

26. The method of claim 16, comprising projecting a two-dimensional video image onto a diffuser disposed beneath the tank, the projected video image being viewable through the tank.

27. The method of claim 16, wherein imaging the escaped light comprises imaging by a plurality of image sensors light escaping from respectively different portions of the tank.

28. The method of claim 16, comprising disposing an LCD panel beneath the tank, and displaying a video image by the LCD panel, the display video image being viewable through the tank, and the LCD panel being transparent to the escaped light.

* * * * *